United States Patent
Gao et al.

(10) Patent No.: US 12,137,434 B2
(45) Date of Patent: Nov. 5, 2024

(54) PAGING INDICATION INFORMATION TRANSMISSION METHOD AND COMMUNICATIONS APPARATUS

(71) Applicant: HUAWEI TECHNOLOGIES CO., LTD., Guangdong (CN)

(72) Inventors: Kuandong Gao, Chengdu (CN); Huang Huang, Chengdu (CN); Mao Yan, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 721 days.

(21) Appl. No.: 17/213,572

(22) Filed: Mar. 26, 2021

(65) Prior Publication Data

US 2021/0219263 A1    Jul. 15, 2021

Related U.S. Application Data

(63) Continuation of application No. PCT/CN2019/108768, filed on Sep. 27, 2019.

(30) Foreign Application Priority Data

Sep. 28, 2018  (CN) .......................... 201811142208.1

(51) Int. Cl.
*H04W 68/00* (2009.01)
*H04W 72/23* (2023.01)
*H04W 76/28* (2018.01)

(52) U.S. Cl.
CPC ......... *H04W 68/005* (2013.01); *H04W 72/23* (2023.01); *H04W 76/28* (2018.02)

(58) Field of Classification Search
CPC .... H04W 68/00; H04W 68/005; H04W 68/02
See application file for complete search history.

(56) References Cited

U.S. PATENT DOCUMENTS

2016/0100422 A1    4/2016  Papasakellariou et al.
2017/0367069 A1    12/2017  Agiwal et al.
(Continued)

FOREIGN PATENT DOCUMENTS

CN    102300157 A    12/2011
CN    107005977 A    8/2017
(Continued)

OTHER PUBLICATIONS

3GPP TS 36.304 V15.0.0 (Jun. 2018), "3rd Generation Partnership Project; Technical Specification Group Radio Access Network; Evolved Universal Terrestrial Radio Access (E-UTRA); User Equipment (UE) procedures in idle mode (Release 15)," Jun. 2018, 52 pages.

(Continued)

*Primary Examiner* — Kevin Kim
(74) *Attorney, Agent, or Firm* — Fish & Richardson P.C.

(57) ABSTRACT

This application provides an example paging indication information transmission method and an example communications apparatus. The method includes the terminal device receiving paging indication information, where the paging indication information includes at least one of the following bits: all or some bits of valid bits of a short message field in downlink control information (DCI), all or some bits of remaining bits of the short message field in the DCI, and all or some bits of a reserved field in the DCI. The method also includes the terminal device determining, based on the paging indication information, whether to detect a physical downlink shared channel (PDSCH).

19 Claims, 5 Drawing Sheets

(56) References Cited

U.S. PATENT DOCUMENTS

2018/0234826 A1 8/2018 Maattanen et al.
2018/0270790 A1 9/2018 Shi et al.
2018/0324727 A1* 11/2018 Zhou .................. H04W 56/004

FOREIGN PATENT DOCUMENTS

| CN | 108012329 A | 5/2018 | |
|---|---|---|---|
| CN | 108270710 A | 7/2018 | |
| CN | 108282861 A | 7/2018 | |
| EP | 3372025 A1 | 9/2018 | |
| WO | WO-2016072770 A1 * | 5/2016 | ............ H04W 4/006 |
| WO | 2016186373 A1 | 11/2016 | |
| WO | 2018174659 A1 | 9/2018 | |
| WO | WO-2018233587 A1 * | 12/2018 | ............... H04B 5/04 |

OTHER PUBLICATIONS

3GPP TS 36.331 V15.2.2 (Jun. 2018), "3rd Generation Partnership Project; Technical Specification Group Radio Access Network; Evolved Universal Terrestrial Radio Access (E-UTRA); Radio Resource Control (RRC); Protocol specification (Release 15)," Jun. 2018, 791 pages.
EPO Communication pursuant to Rule 164(1) EPC Partial Supplementary European Search Report issued in European Application 19866491.4 on Sep. 2, 2021, 14 pages.
Huawei, HiSilicon, "UE power saving for paging," 3GPP TSG RAN WG1 Meeting #95, R1-1812685, Spokane, USA, Nov. 12-16, 2018, 4 pages.
3GPP TS 38.212 V15.3.0 (Sep. 2018), "3rd Generation Partnership Project; Technical Specification Group Radio Access Network; NR; Multiplexing and channel coding (Release 15)," Sep. 2018, 99 pages.
Samsung Electronics, "Correction to description of PO for default association," 3GPP TSG-RAN2 103bis, R2-1813689, Chengdu, China, Oct. 8-12, 2018, 4 pages.
3GPP TS 38.214 V15.2.0 (Jun. 2018), "3rd Generation Partnership Project; Technical Specification Group Radio Access Network; NR; Physical layer procedures for data (Release 15)," Jun. 2018, 94 pages.
Panasonic, "Considerations for paging occasion design in NR," 3GPP TSG-RAN WG2 #101, R2-1804632, Sanya, China, Apr. 16-20, 2018, 4 pages.
3GPP TS 38.331 V15.3.0 (Sep. 2018), "3rd Generation Partnership Project; Technical Specification Group Radio Access Network; NR; Radio Resource Control (RRC) protocol specification (Release 15)," Sep. 2018, 445 pages.
Huawei, HiSilicon, "Efficiency of direct and response-driven paging," 3GPP TSG-RAN WG2 #101, R2-1803637, Athens, Greece, Feb. 26-Mar. 2, 2018, 14 pages.
Office Action in Chinese Application No. 201811142208.1, dated Sep. 29, 2020, 25 pages.
International Search Report and Written Opinion in International Application No. PCT/CN2019/108768, dated Dec. 27, 2019, 17 pages.
Vivo, "Remaining issues on eMBB DCI format," 3GPP TSG RAN WG1 Meeting #93, R1-1806058, Busan, Korea, May 21-25, 2018, 6 pages.
LG Electronics, "Paging design in Nr," 3GPP TSG RAN WG1 Meeting #92, R1-1802205, Athens, Greece, Feb. 26-Mar. 2, 2018, 7 pages.
Huawei et al., "Finalization of NR Paging," 3GPP TSG RAN WG1 Meeting 90bis, R1-1717052, Prague, Czech Republic, Oct. 9-13, 2017, 5 pages.
Office Action in Chinese Application No. 201811142208.1, dated May 10, 2021, 25 pages.

* cited by examiner

PAGING INDICATION INFORMATION TRANSMISSION METHOD AND COMMUNICATIONS APPARATUS

CROSS-REFERENCE TO RELATED APPLICATIONS

This application is a continuation of International Application No. PCT/CN2019/108768, filed on Sep. 27, 2019, which claims priority to Chinese Patent Application No. 201811142208.1, filed on Sep. 28, 2018. The disclosures of the aforementioned applications are hereby incorporated by reference in their entireties.

TECHNICAL FIELD

This application relates to the communications field, and in particular, to a paging indication information transmission method and a communications apparatus.

BACKGROUND

In a wireless communications system, when a network device needs to page a terminal device, the network device may send downlink control information (DCI) on a physical downlink control channel (PDCCH). After detecting the DCI on the PDCCH channel, the terminal device may detect a physical downlink shared channel (PDSCH). If the PDSCH includes an identity (ID) of the terminal device, the terminal device determines that the terminal device itself is paged. If the PDSCH does not include an identity of the terminal device, the terminal device determines that the terminal device itself is not paged.

When the terminal device detects the PDSCH, the identity of the terminal device may not be detected. Consequently, power consumption of detecting the PDSCH by the terminal device is wasted. Therefore, there is an urgent need for a method that can reduce power consumption of detecting a PDSCH by a terminal device.

SUMMARY

Embodiments of this application provide a paging indication information transmission method and a communications apparatus, to reduce power consumption of detecting a PDSCH by a terminal device.

According to a first aspect, an embodiment of this application provides a paging method, including: receiving a paging frame, where the paging frame includes a paging occasion (PO) of a terminal device, the PO is located in the first half of the paging frame, the PO includes a paging message, the paging message and a system message 1 have a common control resource set, and a period of the system message 1 is 5 ms; and determining the paging message in the PO.

According to a second aspect, an embodiment of this application provides a paging method, including: generating a paging frame, where the paging frame includes a PO, the PO is located in the first half of the paging frame, the PO includes a paging message, the paging message and a system message 1 have a common control resource set, and a period of the system message 1 is 5 ms; and sending the paging frame.

According to a third aspect, an embodiment of this application provides a paging indication information transmission method, including: A terminal device receives paging indication information, where the paging indication information includes at least one of the following bits: all or some bits of valid bits of a short message field in DCI, all or some bits of remaining bits of the short message field in the DCI, and all or some bits of a reserved field in the DCI; and the terminal device determines, based on the paging indication information, whether to detect a PDSCH.

In this embodiment of this application, the terminal device may determine, based on the paging indication information, whether to detect the PDSCH, instead of being obliged to detect the PDSCH. This can reduce power consumption of detecting the PDSCH by the terminal device. The paging indication information includes or uses at least one (one or more) of the following bits: all or some bits of the valid bits of the short message field in the DCI, all or some bits of the remaining bits of the short message field in the DCI, and all or some bits of the reserved field in the DCI. In this way, a length of the DCI is not increased, so that power consumption of detecting a PDCCH by the terminal device is not increased.

In a possible implementation, if the paging indication information indicates that the terminal device or a paging group to which the terminal device belongs is paged, the terminal device detects the PDSCH. If the paging indication information indicates that the terminal device or a paging group to which the terminal device belongs is not paged, or if the paging indication information does not indicate that the terminal device or a paging group to which the terminal device belongs is paged, the terminal device does not detect the PDSCH.

In a possible implementation, the paging indication information is used to indicate whether one or more paging groups are paged, where the one or more paging groups include the terminal device. One paging group may include one or more terminal devices. In this way, data transmission overheads can be reduced.

In a possible implementation, before the terminal device determines, based on the paging indication information, whether to detect the PDSCH, the method further includes: The terminal device determines, based on the paging indication information and an identity of the terminal device, whether a paging group to which the terminal device belongs is paged. If the terminal device determines that the paging group to which the terminal device belongs is paged, the terminal device detects the PDSCH. If the terminal device determines that the paging group to which the terminal device belongs is not paged, the terminal device does not detect the PDSCH.

In a possible implementation, a length of the paging indication information is the same as a length of the valid bits of the short message field; a length of the paging indication information is the same as a length of the remaining bits of the short message field; a length of the paging indication information is the same as a length of the reserved field; a length of the paging indication information is the same as a sum of a length of the valid bits of the short message field and a length of the remaining bits of the short message field; a length of the paging indication information is the same as a sum of a length of the valid bits of the short message field and a length of the reserved field; a length of the paging indication information is the same as a sum of a length of the remaining bits of the short message field and a length of the reserved field; or a length of the paging indication information is the same as a sum of a length of the valid bits of the short message field, a length of the remaining bits of the short message field, and a length of the reserved field.

The valid bits of the short message field include some or all bits of the valid bits of the short message field; the remaining bits of the short message field include some or all bits of the remaining bits of the short message field; and the reserved field includes some or all bits of the reserved field.

In a possible implementation, the paging indication information is used to indicate whether the terminal device is paged in a first discontinuous reception (DRX) cycle; or the paging indication information is used to indicate whether the terminal device is paged in a first DRX cycle and n DRX cycles after the first DRX cycle, where n is an integer greater than or equal to 1.

In a possible implementation, the length of the paging indication information is preset or configured by a network device.

For example, the length of the paging indication information may be configured by the network device by using at least one of system information (SI), a master information block (MIB), remaining minimum system information (RMSI), a system information block 1, other system information (OSI), radio resource control (RRC) signaling, a media access control-control element (MAC CE), and DCI.

In a possible implementation, a quantity of bits of the paging indication information is related to at least one of the following: a quantity of paging occasions POs, and a DRX cycle. In other words, the quantity of bits of the paging indication information may be determined based on at least one of the quantity of POs or the DRX cycle.

According to a fourth aspect, an embodiment of this application provides a paging indication information transmission method, including: A network device sends paging indication information, where the paging indication information includes at least one of the following bits: all or some bits of valid bits of a short message field in DCI, all or some bits of remaining bits of the short message field in the DCI, and all or some bits of a reserved field in the DCI; and the network device sends a PDSCH.

In a possible implementation, the paging indication information is used to indicate whether one or more paging groups are paged, where the one or more paging groups include a terminal device.

In a possible implementation, a length of the paging indication information is preset or configured by the network device.

In a possible implementation, the length of the paging indication information is the same as a length of the valid bits of the short message field; the length of the paging indication information is the same as a length of the remaining bits of the short message field; the length of the paging indication information is the same as a length of the reserved field; the length of the paging indication information is the same as a sum of a length of the valid bits of the short message field and a length of the remaining bits of the short message field; the length of the paging indication information is the same as a sum of a length of the valid bits of the short message field and a length of the reserved field; the length of the paging indication information is the same as a sum of a length of the remaining bits of the short message field and a length of the reserved field; or the length of the paging indication information is the same as a sum of a length of the valid bits of the short message field, a length of the remaining bits of the short message field, and a length of the reserved field.

The valid bits of the short message field include some or all bits of the valid bits of the short message field; the remaining bits of the short message field include some or all bits of the remaining bits of the short message field; and the reserved field includes some or all bits of the reserved field.

In a possible implementation, the paging indication information is used to indicate whether the terminal device is paged in a first DRX cycle; or the paging indication information is used to indicate whether the terminal device is paged in a first DRX cycle and n DRX cycles after the first DRX cycle, where n is an integer greater than or equal to 1.

In a possible implementation, the length of the paging indication information is configured by the network device by using at least one of SI, a MIB, RMSI, a system information block 1, OSI, RRC signaling, a MAC CE, and DCI.

In a possible implementation, a quantity of bits of the paging indication information is related to at least one of the following: a quantity of POs, and a DRX cycle.

In a possible design, when a plurality of (for example, two) paging occasions are in a frequency division multiplexing manner or are in one control resource set, the paging indication information may be used to distinguish the paging occasions in the control resource set.

In a possible design, when a plurality of (for example, two) paging occasions are in a frequency division multiplexing manner or are in one control resource set, the paging indication information may be used to distinguish different paging occasions by using different control channel elements.

According to a fifth aspect, an embodiment of this application provides a communications apparatus. The communications apparatus may be a terminal device, including: a receiving unit, configured to receive a paging frame, where the paging frame includes a paging occasion (PO) of the terminal device, the PO is located in the first half of the paging frame, the PO includes a paging message, the paging message and a system message 1 have a common control resource set, and a period of the system message 1 is 5 ms; and a determining unit, configured to determine the paging message in the PO.

According to a sixth aspect, an embodiment of this application provides a communications apparatus. The communications apparatus may be a network device, including: a processing unit, configured to generate a paging frame, where the paging frame includes a PO, the PO is located in the first half of the paging frame, the PO includes a paging message, the paging message and a system message 1 have a common control resource set, and a period of the system message 1 is 5 ms; and a sending unit, configured to send the paging frame.

According to a seventh aspect, an embodiment of this application provides a communications apparatus. The communications apparatus may be a terminal device, including: a receiving unit, configured to receive paging indication information, where the paging indication information includes at least one of the following bits: all or some bits of valid bits of a short message field in DCI, all or some bits of remaining bits of the short message field in the DCI, and all or some bits of a reserved field in the DCI; and a determining unit, configured to determine, based on the paging indication information, whether to detect a PDSCH.

In a possible implementation, the paging indication information is used to indicate whether one or more paging groups are paged, where the one or more paging groups include the terminal device.

In a possible implementation, the determining unit is further configured to determine, based on the paging indication information and an identity of the terminal device, whether a paging group to which the terminal device belongs is paged.

In a possible implementation, a length of the paging indication information is preset or configured by a network device.

In a possible implementation, the length of the paging indication information is the same as a length of the valid bits of the short message field; the length of the paging indication information is the same as a length of the remaining bits of the short message field; the length of the paging indication information is the same as a length of the reserved field; the length of the paging indication information is the same as a sum of a length of the valid bits of the short message field and a length of the remaining bits of the short message field; the length of the paging indication information is the same as a sum of a length of the valid bits of the short message field and a length of the reserved field; the length of the paging indication information is the same as a sum of a length of the remaining bits of the short message field and a length of the reserved field; or the length of the paging indication information is the same as a sum of a length of the valid bits of the short message field, a length of the remaining bits of the short message field, and a length of the reserved field.

In a possible implementation, the valid bits of the short message field include some or all bits of the valid bits of the short message field; the remaining bits of the short message field include some or all bits of the remaining bits of the short message field; and the reserved field includes some or all bits of the reserved field.

In a possible implementation, the paging indication information is used to indicate whether the terminal device is paged in a first DRX cycle; or the paging indication information is used to indicate whether the terminal device is paged in a first DRX cycle and n DRX cycles after the first DRX cycle, where n is an integer greater than or equal to 1.

In a possible implementation, the length of the paging indication information is configured by the network device by using at least one of SI, a MIB, RMSI, a system information block 1, OSI, RRC signaling, a MAC CE, and DCI.

In a possible implementation, a quantity of bits of the paging indication information is related to at least one of the following: a quantity of POs, and a DRX cycle.

According to an eighth aspect, an embodiment of this application provides a communications apparatus. The communications apparatus may be a network device, including: a sending unit, configured to send paging indication information, where the paging indication information includes at least one of the following bits: all or some bits of valid bits of a short message field in DCI, all or some bits of remaining bits of the short message field in the DCI, and all or some bits of a reserved field in the DCI; and the sending unit is further configured to send a PDSCH.

In a possible implementation, the paging indication information is used to indicate whether one or more paging groups are paged, where the one or more paging groups include a terminal device.

In a possible implementation, a length of the paging indication information is preset or configured by the network device.

In a possible implementation, the length of the paging indication information is the same as a length of the valid bits of the short message field; the length of the paging indication information is the same as a length of the remaining bits of the short message field; the length of the paging indication information is the same as a length of the reserved field; the length of the paging indication information is the same as a sum of a length of the valid bits of the short message field and a length of the remaining bits of the short message field; the length of the paging indication information is the same as a sum of a length of the valid bits of the short message field and a length of the reserved field; the length of the paging indication information is the same as a sum of a length of the remaining bits of the short message field and a length of the reserved field; or the length of the paging indication information is the same as a sum of a length of the valid bits of the short message field, a length of the remaining bits of the short message field, and a length of the reserved field.

The valid bits of the short message field include some or all bits of the valid bits of the short message field; the remaining bits of the short message field include some or all bits of the remaining bits of the short message field; and the reserved field includes some or all bits of the reserved field.

In a possible implementation, the paging indication information is used to indicate whether the terminal device is paged in a first DRX cycle; or the paging indication information is used to indicate whether the terminal device is paged in a first DRX cycle and n DRX cycles after the first DRX cycle, where n is an integer greater than or equal to 1.

In a possible implementation, the length of the paging indication information is configured by the network device by using at least one of SI, a MIB, RMSI, a system information block 1, OSI, RRC signaling, a MAC CE, and DCI.

In a possible implementation, a quantity of bits of the paging indication information is related to at least one of the following: a quantity of POs, and a DRX cycle.

According to a ninth aspect, an embodiment of this application provides a communications apparatus. A structure of the communications apparatus includes a processor and a memory. The memory is configured to: be coupled to the processor, and store a program instruction and data that are necessary for the communications apparatus. The processor is configured to execute the program instruction stored in the memory, so that the communications apparatus performs the method according to any implementation of any one of the foregoing aspects.

According to a tenth aspect, an embodiment of this application provides a terminal device or a network device. The terminal device or the network device may implement a corresponding function in the foregoing method embodiment, and the function may be implemented by hardware, or may be implemented by hardware executing corresponding software. The hardware or the software includes one or more modules corresponding to the foregoing function.

In a possible design, a structure of the terminal device or the network device includes a processor and a communications interface. The processor is configured to support the terminal device or the network device in performing a corresponding function in the foregoing method. The communications interface is configured to support communication between the terminal device or the network device and another network element. The terminal device or the network device may further include a memory. The memory is configured to be coupled to the processor, and store a program instruction and data that are necessary for the terminal device or the network device.

According to an eleventh aspect, an embodiment of this application provides a computer-readable storage medium, including a computer program or an instruction. When the computer program or the instruction is run on a computer, the computer is enabled to perform any method provided in any one of the foregoing aspects.

According to a twelfth aspect, an embodiment of this application provides a computer program product including an instruction. When the computer program product runs on a computer, the computer is enabled to perform any method provided in any one of the foregoing aspects.

According to a thirteenth aspect, an embodiment of this application provides a chip system. The chip system includes a processor, configured to invoke a computer program or an instruction from a memory. When the computer program or the instruction is run, any method provided in any one of the foregoing aspects is performed. The chip system may further include a memory. The chip system may include a chip, or may also include a chip and another discrete component.

According to a fourteenth aspect, a paging system is provided, where the system includes the communications apparatus provided in the fifth aspect and the communications apparatus provided in the sixth aspect, or the system includes the communications apparatus provided in the seventh aspect and the communications apparatus provided in the eighth aspect.

DESCRIPTION OF EMBODIMENTS

Embodiments of this application provide a paging indication information transmission method and a communications apparatus, used in a process in which a terminal device receives DCI and a process whether to detect (monitor) a PDSCH after receiving the DCI. For example, the embodiment is used in a process in which the terminal device receives the DCI in an idle state or a connected state, and a process whether to detect the PDSCH in one or more DRX cycles after receiving the DCI. The DCI carries paging indication information.

Figure 1:
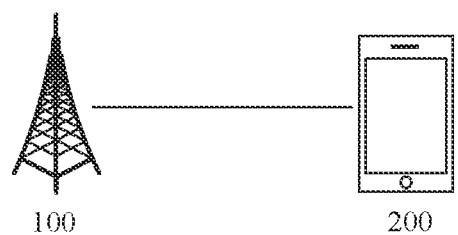
FIG. 1 is a schematic diagram of a system architecture to which a paging indication information transmission method is applicable according to an embodiment of this application.

FIG. 1 is a schematic diagram of a communications system applicable to a technical solution according to an embodiment of this application. The communications system may include a network device 100 and one or more terminal devices 200 (FIG. 1 shows only one terminal device 200) connected to the network device 100. Data transmission may be performed between the network device and the terminal device.

The network device 100 may be a device that can communicate with the terminal device 200. For example, the network device 100 may be a base station. The base station may be a base transceiver station (BTS) in a global system for mobile communications (GSM) or code division multiple access (CDMA), or may be a NodeB (NB) in wideband code division multiple access (WCDMA), or may be an evolved NodeB (eNB or eNodeB) in LTE, or may be a base station in NR, a relay station or an access point, a base station in a future network, or the like. This is not limited in this embodiment of this application. The base station in the NR may also be referred to as a transmission reception point (TRP) or a gNB. In this embodiment of this application, a communications apparatus configured to implement a function of the network device may be a network device, or may be a communications apparatus that can support the network device in implementing the function, for example, a chip system. In this embodiment of this application, the chip system may include a chip, or may include a chip and another discrete component. In the technical solutions provided in this embodiment of this application, an example in which the communications apparatus configured to implement a function of the network device may be a network device is used to describe the technical solutions provided in this embodiment of this application.

The terminal device 200 in this embodiment of this application may also be referred to as a terminal, and may be a device with a wireless transceiver function. The terminal may be deployed on land, including an indoor or outdoor terminal, a handheld terminal, or a vehicle-mounted terminal. The terminal may also be deployed on water (for example, on a ship), or in the air (for example, on an aircraft, a balloon, and a satellite). The terminal device may be user equipment (UE). The UE includes a handheld device, a vehicle-mounted device, a wearable device, or a computing device that has a wireless communication function. For example, the UE may be a mobile phone, a tablet computer, or a computer having a wireless transceiver function. Alternatively, the terminal device may be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city, a wireless terminal in a smart home, or the like. In this embodiment of this application, the communications apparatus configured to implement a function of the terminal may be a terminal, or may be a communications apparatus that can support the terminal in implementing the function, for example, a chip system. In the technical solutions provided in this embodiment of this application, an example in which the communications apparatus configured to implement a function of the terminal may be a terminal device is used to describe the technical solutions provided in this embodiment of this application.

The network device 100 or the terminal device 200 in FIG. 1 in this embodiment of this application may be implemented by one device, or may be a functional module in one device. This is not specifically limited in this embodiment of this application. It may be understood that the foregoing function may be a network element in a hardware device, a software function running on dedicated hardware, a virtualization function instantiated on a platform (for example, a cloud platform), or a chip system. In this embodiment of this application, the chip system may include a chip, or may include a chip and another discrete component.

Figure 2:
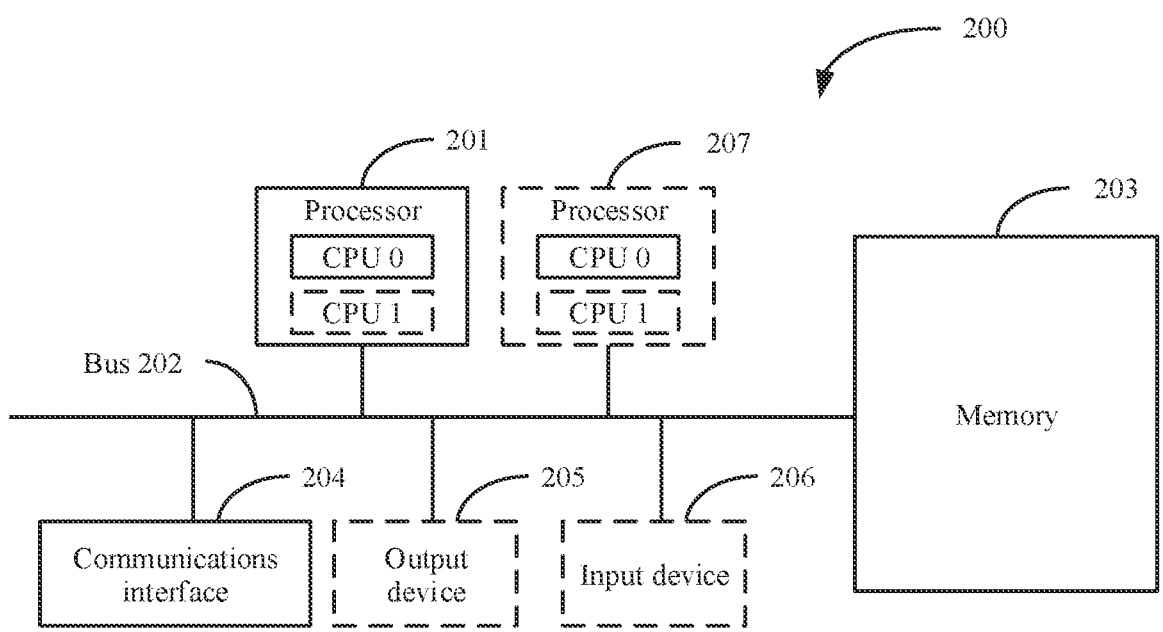
FIG. 2 is a schematic structural diagram of a terminal device according to an embodiment of this application.

For example, the communications apparatus configured to implement a function of the terminal device provided in this embodiment of this application may be implemented by using a communications apparatus 200 in FIG. 2. FIG. 2 is a schematic diagram of a hardware structure of the communications apparatus 200 according to an embodiment of this application. The communications apparatus 200 includes at least one processor 201, configured to implement the function of the terminal device provided in this embodiment of this application. The communications apparatus 200 may further include a bus 202 and at least one communications interface 204. The communications apparatus 200 may further include a memory 203.

In this embodiment of this application, the processor may be a central processing unit (CPU), a general-purpose processor or a network processor (NP), a digital signal processor (DSP), a microprocessor, a microcontroller, a programmable logic device (PLD), or any combination thereof. The processor may alternatively be any other apparatus having a processing function, for example, a circuit, a component, or a software module.

The bus 202 may be used for transmitting information between the foregoing components.

The communications interface 204 is configured to communicate with another device or a communications network, for example, an Ethernet, a radio access network (RAN), or a wireless local area network (WLAN). The communications interface 204 may be an interface, a circuit, a transceiver, or another apparatus that can implement communication. This is not limited in this application. The communications interface 204 may be coupled to the processor 201. The coupling in this embodiment of this application may be indirect coupling or a communication connection between apparatuses, units, or modules in an electrical form, a mechanical form, or another form, and is used for information exchange between the apparatuses, the units, or the modules.

In this embodiment of this application, the memory may be a read-only memory (ROM) or another type of static storage device that can store static information and an instruction, a random access memory (RAM) or another type of dynamic storage device that can store information and an instruction, an electrically erasable programmable read-only memory (EEPROM), a compact disc read-only memory (CD-ROM) or another compact disc storage, optical disc storage (including a compact disc, a laser disc, an optical disc, digital versatile disc, a Blu-ray optical disc, and the like), a magnetic disk storage medium or another magnetic storage device, or any other medium that can be used to carry or store expected program code in an instruction or data structure form and that can be accessed by a computer. However, the memory is not limited thereto. The memory may exist independently, or may be coupled to the processor, for example, by using the bus 202. The memory may also be integrated with the processor.

The memory 203 is configured to store a program instruction, and the processor 201 may control execution of the program instruction, to implement a resource scheduling method provided in the following embodiments of this application. The processor 201 is configured to invoke and execute the instruction stored in the memory 203, to implement the resource scheduling method provided in the following embodiments of this application.

Optionally, the computer-executable instruction in this embodiment of this application may also be referred to as an application program code. This is not specifically limited in this embodiment of this application.

Optionally, the memory 203 may be included in the processor 201.

During specific implementation, in an embodiment, the processor 201 may include one or more CPUs, for example, a CPU 0 and a CPU 1 in FIG. 2.

During specific implementation, in an embodiment, the communications device 200 may include a plurality of processors, for example, the processor 201 and a processor 207 in FIG. 2. Each of these processors may be a single-core processor, or may be a multi-core processor. The processor herein may be one or more devices, circuits, and/or processing cores configured to process data (for example, a computer program instruction).

During specific implementation, in an embodiment, the communications apparatus 200 may further include an output device 205 and an input device 206. The output device 205 is coupled to the processor 201, and may display information in a plurality of manners. For example, the output device 205 may be a liquid crystal display (LCD), a light emitting diode (LED) display device, a cathode ray tube (CRT) display device, or a projector. The input device 206 is coupled to the processor 201, and may receive an input from a user in a plurality of manners. For example, the input device 206 may be a mouse, a keyboard, a touchscreen device, or a sensing device.

The foregoing communications apparatus 200 may be a general-purpose device or a dedicated device. During specific implementation, the communications apparatus 200 may be a desktop computer, a portable computer, a network server, a palmtop computer, a mobile phone, a tablet computer, a wireless terminal device, an embedded device, or a device having a structure similar to that in FIG. 2. A type of the communications apparatus 200 is not limited in this embodiment of this application.

Figure 3:
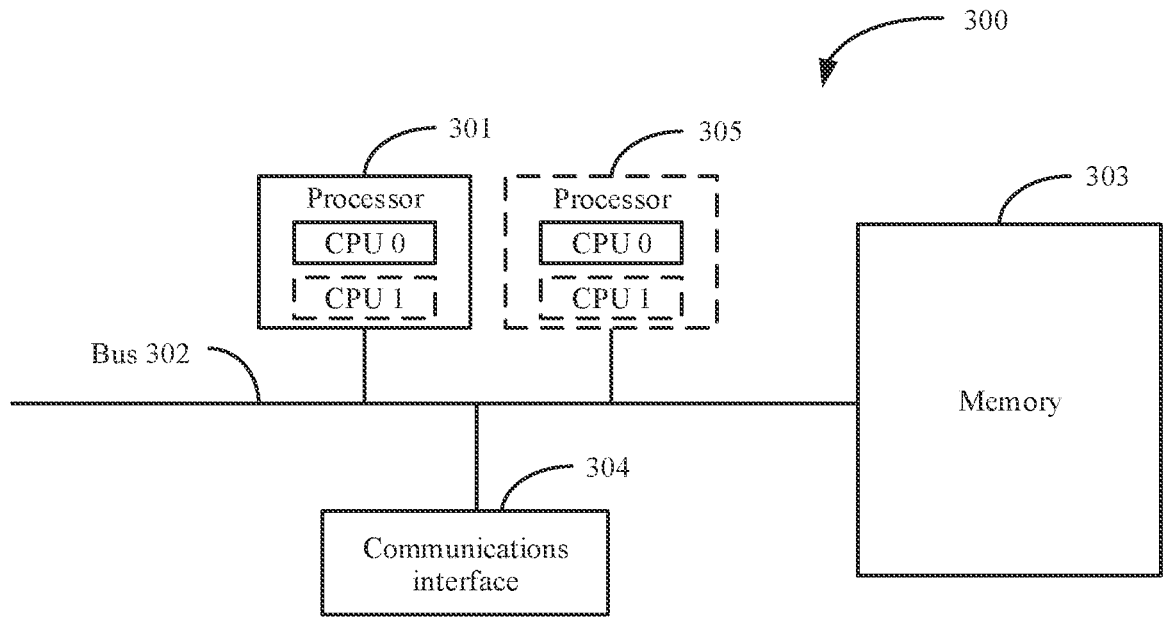
FIG. 3 is a schematic structural diagram of a network device according to an embodiment of this application.

For example, the communications apparatus configured to implement a function of a network device provided in this embodiment of this application may be implemented by using a communications apparatus 300 in FIG. 3. FIG. 3 is a schematic diagram of a hardware structure of the communications apparatus 300 according to an embodiment of this application. The communications apparatus 300 includes at least one processor 301, configured to implement a function of a terminal device provided in this embodiment of this application. The communications apparatus 300 may further include a bus 302 and at least one communications interface 304. The communications apparatus 300 may further include a memory 303.

The bus 302 may be used for transmitting information between the foregoing components.

The communications interface 304 is configured to communicate with another device or a communications network, for example, an Ethernet, a RAN, or a WLAN. The communications interface 304 may be an interface, a circuit, a transceiver, or another apparatus that can implement communication. This is not limited in this application. The communications interface 304 may be coupled to the processor 301.

The memory 303 is configured to store a program instruction, and the processor 301 may control execution of the program instruction, to implement a resource scheduling method provided in the following embodiments of this application. For example, the processor 301 is configured to invoke and execute the instruction stored in the memory 303, to implement the resource scheduling method provided in the following embodiments of this application.

Optionally, the memory 303 may be included in the processor 301.

During specific implementation, in an embodiment, the processor 301 may include one or more CPUs, for example, a CPU 0 and a CPU 1 in FIG. 3.

During specific implementation, in an embodiment, the communications device 300 may include a plurality of processors, for example, the processor 301 and a processor 305 in FIG. 3. Each of these processors may be a single-core processor, or may be a multi-core processor. The processor herein may be one or more devices, circuits, and/or processing cores configured to process data (for example, a computer program instruction).

The following describes the technical solutions in this embodiment of this application with reference to the accompanying drawings in the embodiments of this application. In the descriptions of this application, unless otherwise specified, "at least one" means one or more, and "a plurality of" means two or more. In addition, to clearly describe the technical solutions in the embodiments of this application, in the embodiments of this application, terms such as "first" and "second" are used to distinguish between same objects or similar objects whose functions and purposes are basically the same. A person skilled in the art may understand that the terms such as "first" and "second" do not limit a quantity or an execution sequence, and the terms such as "first" and "second" do not indicate a definite difference.

When the information in this application is configured by the network device, the network device may perform configuration by using at least one of the following signaling: SI, a MIB, RMSI, a SIB 1, OSI, RRC signaling, a MAC CE, a physical broadcast channel (PBCH), and DCI.

Figure 4:
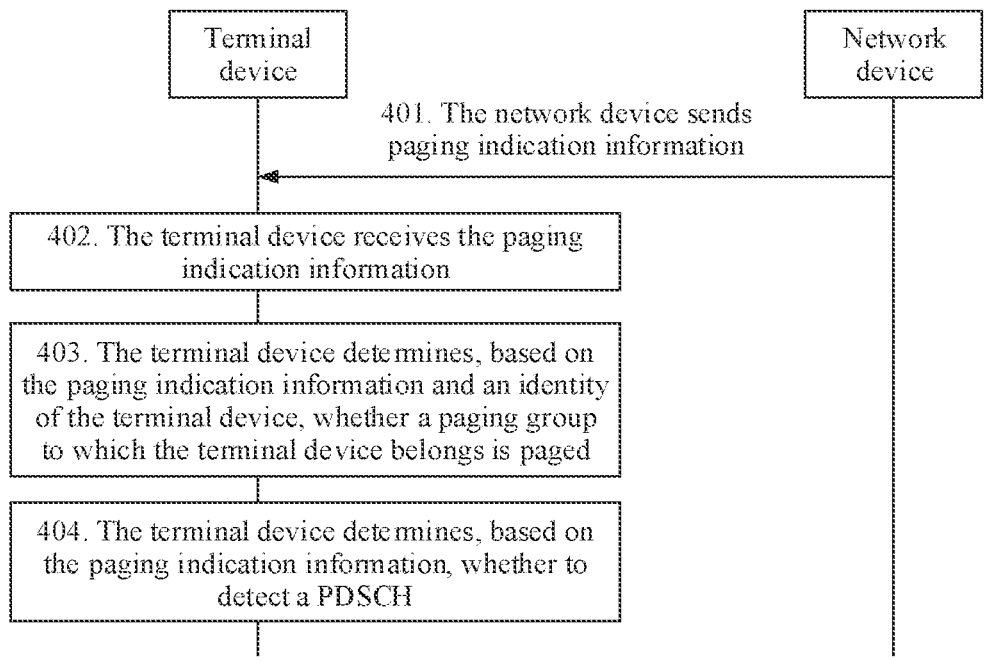
FIG. 4 is a schematic diagram of signal interaction applicable to a paging indication information transmission method according to an embodiment of this application.

An embodiment of this application provides a paging indication information transmission method, as shown in FIG. 4, including the following steps:

401. A network device sends paging indication information.

The network device may send DCI through a PBCH or a PDCCH, and the DCI carries the paging indication information.

402. A terminal device receives the paging indication information.

The terminal device may receive the DCI sent by the network device through the PBCH or the PDCCH, and the DCI carries the paging indication information.

A length of the paging indication information is preset or configured by the network device. For example, the length of the paging indication information may be configured by the network device by using at least one of SI, a MIB, RMSI, a SIB 1, OSI, RRC signaling, a MAC CE, a PBCH, and DCI. The OSI may be a system information block 2 (SIB 2), a system information block 3 (SIB 3), a system information block 4 (SIB 4), a system information block 5 (SIB 5), a system information block 6 (SIB 6), a system information block 7 (SIB 7) or a system information block 8 (SIB 8). For example, when the terminal device is in an idle state, the length of the paging indication information may be configured by using the system information. This is because a time (a moment or a time period) at which the terminal device receives a system message is earlier than a time at which the terminal device receives a paging message.

In a possible design, the paging indication information is used to indicate whether one paging group is paged, or the paging indication information may be used to indicate whether a plurality of paging groups are paged. One paging group may include one or more terminal devices. In this way, data transmission overheads can be reduced.

For example, if a quantity of data bits of the paging indication information configured by the network device by using a system message 1 is 16, the 16 bits may be grouped into 16 groups. That is, each bit represents (corresponds to) one paging group. For a bit corresponding to each paging group, if a value of the bit is 0, it indicates that no terminal device in the group is paged; or if a value of the bit is 1, it indicates that a terminal device in the group is paged.

In a possible design, the paging indication information may indicate a location of a paging occasion in a paging frame. For example, when the paging message and the system message 1 have a common control resource set, if a period of the system message 1 is 5 ms, and there is one paging occasion in one paging frame, one bit may be used to indicate whether the paging occasion is located in the first half of the paging frame or the second half of the paging frame. That is, one bit is used to indicate whether the paging message and the system message 1 located in the first half of the paging frame have a common control resource set, or the paging message and the system message 1 located in the second half of the paging frame have a common control resource set.

In a possible design, the paging occasion is located in the first half of the paging frame or located in the second half of the paging frame. For example, when the paging message and the system message 1 have a common control resource set, if a period of the system message 1 is 5 ms, and there is one paging occasion in one paging frame, the paging occasion may be located in the first half of the paging frame or the second half of the paging frame. That is, the paging message and the system message 1 located in the first half of the paging frame have a common control resource set, or the paging message and the system message 1 located in the second half of the paging frame have a common control resource set. When the paging occasion is located in the first half of the paging frame, the terminal device may receive the paging message in advance, so that a waiting time of the terminal device can be reduced, and power consumption of the terminal device can be reduced.

In a possible design, when a plurality of (for example, two) paging occasions are in a frequency division multiplexing manner or are in one control resource set, the paging indication information may be used to distinguish the paging occasions in the control resource set. For example, one bit may be used for distinguishing, or two bits of data may be used for distinguishing. For example, 0 indicates a first paging occasion, and 1 indicates a second paging occasion. The paging indication information may be an independent field in the DCI, or may use another field in the DCI.

In a possible design, when a plurality of (for example, two) paging occasions are in a frequency division multiplexing manner or are in one control resource set, the paging indication information may be used to distinguish different paging occasions by using different control channel elements. An indication method is $L*((Y+\text{floor}(m*N/(L*M))+k1*n1+k2*n2) \bmod \text{floor}(N/L))+I$. Y may be 0. L represents an aggregation level of the control channel elements. M represents a quantity of candidate PDCCHs for one or more POs (for example, the quantity of candidate PDCCHs may be a maximum quantity of PDCCHs for one or more POs, may be a quantity of PDCCHs corresponding to any PO (where the quantity of PDCCHs for each PO in one or more POs may be the same), may be a minimum quantity of PDCCHs for one or more POs, or may be an average quantity of PDCCHs for one or more POs), m represents the quantity of candidate PDCCHs. N represents a quantity of control channel elements, n1 represents a carrier index, and n2 represents a paging occasion index. Values of n1 and n2 may be one value. That is, n1 is 0, and values of k1 and k2 may be constants. For example, the two values are both 1. That is, k1 and k2 do not exist, or may be other values. For a dedicated search space of the terminal device, a value of n2 may be 0, and floor represents rounding down. Different paging occasions are distinguished by using n2.

In a possible design, the paging indication information may be used to indicate whether the terminal device is paged in a first DRX cycle; or the paging indication information is used to indicate whether the terminal device is paged in a first DRX cycle and n DRX cycles after the first DRX cycle, where n is greater than or equal to 1. The first DRX cycle is a DRX cycle in which related information of the paging message is located. The related information of the paging message may be a control resource of the paging message, a PDCCH of the paging message, DCI information of the paging message, or a PDSCH of the paging message. This is not limited in this application.

Figure 5:
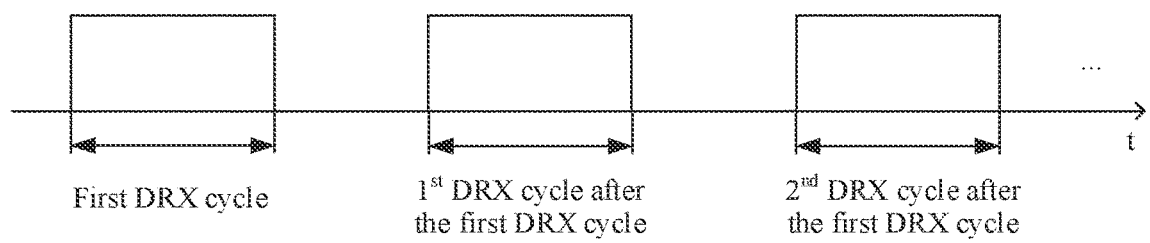
FIG. 5 is a schematic diagram of a DRX cycle according to an embodiment of this application.

For example, as shown in FIG. 5, when n=0, the paging indication information is used to indicate whether the terminal device is paged in the first DRX cycle; when n=1, the paging indication information is used to indicate whether the terminal device is paged in the first DRX cycle and the $1^{st}$ DRX cycle after the first DRX cycle (that is, a next DRX cycle of the first DRX cycle), and when n=2, the paging indication information is used to indicate whether the terminal device is paged in the first DRX cycle, the $1^{st}$ DRX cycle after the first DRX cycle and the $2^{nd}$ DRX cycle after the first DRX cycle (that is, a DRX cycle after the next DRX cycle of the first DRX cycle, or a next DRX cycle of the 1 DRX cycle after the first DRX cycle).

Optionally, a quantity of bits of the paging indication information is related to at least one of the following: a quantity of paging occasions POs, and a DRX cycle.

In a possible design, the terminal device may receive a plurality of pieces of paging indication information configured by the network device, and quantities of bits (that is, corresponding quantities of paging groups) included in the plurality of pieces of paging indication information may be the same or different. Each piece of paging indication information may be used to indicate whether the terminal device is paged in the first DRX cycle, or used to indicate whether the terminal device is paged in the first DRX cycle and n DRX cycles after the first DRX cycle.

In a possible design, the length of the paging indication information is the same as a length of valid bits of a short message field; the length of the paging indication information is the same as a length of remaining bits of a short message field; the length of the paging indication information is the same as a length of a reserved field in the DCI; the length of the paging indication information is the same as a sum of a length of valid bits of a short message field and a length of remaining bits of the short message field; the length of the paging indication information is the same as a sum of a length of valid bits of a short message field and a length of a reserved field in the DCI; the length of the paging indication information is the same as a sum of a length of remaining bits of a short message field and a length of a reserved field in the DCI; or the length of the paging indication information is the same as a sum of a length of valid bits of a short message field, a length of remaining bits of the short message field, and a length of a reserved field in the DCI. The valid bits of the short message field may include some or all bits, the remaining bits of the short message field may include some or all bits, and the reserved field in the DCI may include some or all bits. In this way, a length of the DCI is not increased, so that power consumption of detecting a PDCCH by the terminal device does not increase.

For example, if the valid bits of the short message field include 2 bits, the remaining bits of the short message field include 6 bits, and the reserved field in the DCI includes 6 bits, and if the length of the paging indication information is the same as the length of the valid bits of the short message field, the length of the paging indication information may be either 1 or 2. If the length of the paging indication information is the same as the length of the remaining bits of the short message field, the length of the paging indication information may be any one of 1, 2, 3, 4, 5, or 6. If the length of the paging indication information is the same as the length of the reserved field in the DCI, the length of the paging indication information may be any one of 1, 2, 3, 4, 5, or 6. If the length of the paging indication information is the same as a sum of the length of the valid bits of the short message field and the length of the remaining bits of the short message field, the length of the paging indication information may be any one of 1, 2, 3, 4, 5, 6, 7, or 8. If the length of the paging indication information is the same as a sum of the length of the valid bits of the short message field and the length of the reserved field in the DCI, the length of the paging indication information may be any one of 1, 2, 3, 4, 5, 6, 7, or 8. If the length of the paging indication information is the same as a sum of the length of the remaining bits of the short message field and the length of the reserved fields in the DCI, the length of the paging indication information may be any one of 1, 2, 3, 4, 5, 6, 7, 8, 9, 10, 11, or 12. If the length of the paging indication information is the same as a sum of the length of the valid bits of the short message field, the length of the remaining bits of the short message field, and the length of the reserved field in the DCI, the length of the paging indication information may be any one of 1, 2, 3, 4, 5, 6, 7, 8, 9, 10, 11, 12, 13, or 14.

In a possible design, the paging indication information includes or uses at least one of the following bits: all or some bits of the valid bits of the short message field in the DCI, all or some bits of the remaining bits of the short message field in the DCI, and all or some bits of the reserved field in the DCI. The short message field in the DCI includes the valid bits and the remaining bits. The reserved field in the DCI may include two reserved fields, for example, may include a first reserved field and a second reserved field. The first reserved field may be a reserved field of a short message in the DCI. The second reserved field may be referred to as a reserved field, and the field is an independent field and does not belong to any other field in the DCI. The bits included in or used by the paging indication information may be preset or configured by the network device.

In other words, the paging indication information may include or use all or some bits of the valid bits of the short message field in the DCI; the paging indication information includes or uses all or some bits of the remaining bits of the short message field in the DCI; the paging indication information includes or uses all or some bits of the reserved field in the DCI; the paging indication information includes or uses a sum of all or some bits of the valid bits of the short message field in the DCI and all or some bits of the remaining bits of the short message field in the DCI; the paging indication information includes or uses a sum of all or some bits of the valid bits of the short message field in the DCI and all or some bits of the reserved field in the DCI; the paging indication information includes or uses a sum of all or some bits of the remaining bits of the short message field in the DCI and all or some bits of the reserved field in the DCI; or the paging indication information includes or uses a sum of all or some bits of the valid bits of the short message field in the DCI, all or some bits of the remaining bits of the short message field in the DCI, and all or some bits of the reserved field in the DCI.

In a possible design, the terminal device may determine, based on a short message indication, the field used by the paging indication information. On one hand, when the short message indication in the DCI indicates that only scheduling information exists (or is valid) in the DCI, or when the short message indication in the DCI indicates that scheduling information exists but the short message field does not exist (or is invalid) in the DCI, for example, when the short message indication in the DCI is 01, the paging indication information may include one or more of the following bits: all or some bits of the valid bits of the short message field in the DCI, all or some bits of the remaining bits of the short message field in the DCI, and all or some bits of the reserved field in the DCI. For example, if the valid bits of the short message field include 2 bits, the remaining bits of the short message field include 6 bits, and the bits of the reserved field in the DCI include 6 bits, the paging indication information may use 2 bits included in the valid bits of the short message field and 6 bits included in the remaining bits of the short message field. For another example, the paging indication information may use 2 bits included in the valid bits of the short message field, 6 bits included in the remaining bits of the short message field, and 6 bits included in the reserved field in the DCI. On the other hand, when the short message indication in the DCI indicates that both the scheduling information and the short message field exist (and both are valid) in the DCI, for example, when the short message indication in the DCI is 11, the paging indication information may include at least one of the following bits, all or some bits of the remaining bits of the short message field in the DCI, and all or some bits of the reserved field in the DCI. For example, the paging indication information may use 6 bits included in the remaining bits of the short message field in the DCI. For another example, the paging indication information may use 6 bits included in the reserved field in the DCI. For another example, the paging indication information may use 6 bits included in the remaining bits of the short message field in the DCI and 6 bits included in the reserved field in the DCI.

Optionally, the paging indication information may use one or more of the following fields (information): bandwidth information (for example, frequency domain resource indication information) in the DCI, time domain information (for example, time domain resource indication information), a mapping field of a virtual resource block to a physical resource block, a modulation and coding scheme field, a transport block (TB) scaling factor field, or the like.

403. The terminal device determines, based on the paging indication information and an identity of the terminal device, whether a paging group to which the terminal device belongs is paged.

After receiving the paging indication information in the DRX cycle, the terminal device may determine, based on all or some bits of the identity of the terminal device, the paging group to which the terminal device itself belongs, and further determine, based on the paging indication information, whether the paging group to which the terminal device belongs is paged. The identity of the terminal device may be a system architecture evolution-temporary mobile subscriber identity (S-TMSI), or may be a UE ID in a semi-active/inactive (inactive) state. The identity of the terminal device may alternatively be an international mobile subscriber identity (IMSI), or may be a semi-active (inactive) radio network temporary identity (RNTI).

In a possible design, the paging group to which the terminal device belongs may be calculated based on the last M bits of the identity of the terminal device, the paging group to which the terminal device belongs may be calculated based on the middle M bits of the identity of the terminal device, or the paging group to which the terminal device belongs is calculated based on the first M bits of the identity of the terminal device. When a quantity of data bits used to calculate the paging group is a quantity of the middle M bits, a start location of the data bits may be configured by the network device. A value of M may be configured by the network device, or may be determined by the terminal device based on the quantity of paging groups that is indicated by the paging indication information.

Figure 6:
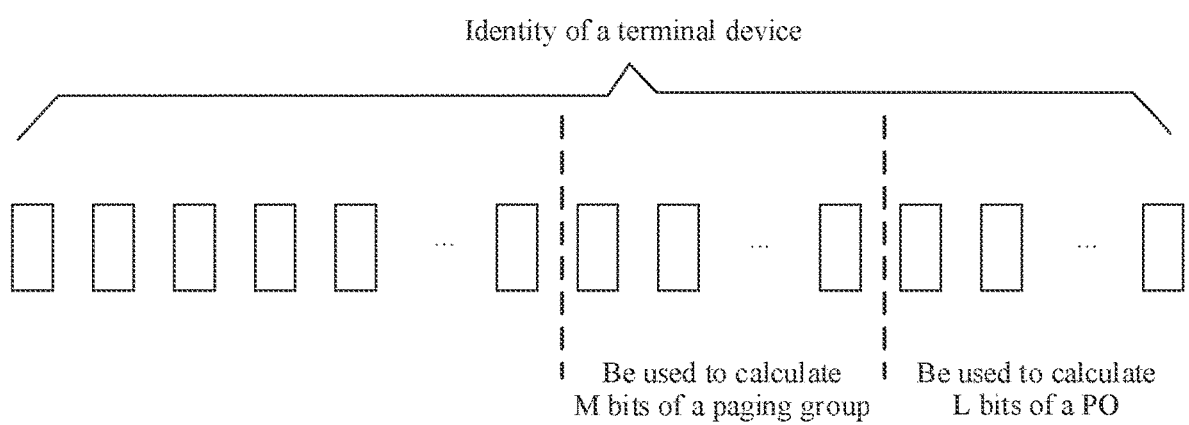
FIG. 6 is a schematic diagram of an identity of a terminal device according to an embodiment of this application.

For example, as shown in FIG. 6, if the identity (for example, an IMSI) of the terminal device includes 64 bits, K bits of paging indication information are 16 bits (where the bits may be used to indicate whether K paging groups are paged). Minimum L bits of an IMSI ID may be bits used to calculate a PO, for example, $L=\log_2 N=8$. M bits adjacent to the minimum L bits may be bits used to calculate a paging group corresponding to the terminal device, for example, $M=\lceil \log_2 K \rceil=4$. A possible calculation manner is: n=xxxx mod K, where xxxx represents the M bits, and n represents an index of a paging group to which the terminal device belongs. Another possible calculation manner is: n=(IMSI/N) mod K, where n represents an index of a paging group to which the terminal device belongs, N represents a quantity of POs of the terminal device, and $\lceil \ \rceil$ represents rounding up.

In another possible design, the paging group to which the terminal device belongs may be calculated by using an independent UE ID configured by the network device for the terminal device. For example, a possible calculation manner is: UE ID mod M2=n, where M2 indicates a quantity of UE groups or a quantity of paging groups, the UE grouping or the paging grouping may indicate grouping of paging groups for terminal devices on a same paging occasion, and n indicates an index of the paging group to which the terminal device belongs.

Paging group information of the terminal device (that is, the paging group to which the terminal device belongs) or a paging identity corresponding to the terminal device may be determined by the terminal device and reported to the network device. The paging identity corresponding to the terminal device may be used to page the terminal device. For example, after entering a tracking area (TA), the terminal device may report paging group information or a paging identity corresponding to the TA when using network attached storage (NAS) information to register with or attach to a mobility management entity (MME). The paging group information of the terminal device or the paging identity of the terminal device may be determined based on the identity of the terminal device and/or a search space of the paging information. If the terminal device moves from one TA area to another TA, the terminal device may re-report paging group information or a paging identity of the TA area to which the terminal device moves, so that a paging period can be shorter. Alternatively, the paging group information of the terminal device or the paging identity of the terminal device may be allocated by the network device (for example, an MME or a base station). For example, after the terminal device enters the TA, and when the terminal device is registered with or attached to the MME, the MME allocates the paging group information or the paging identity of the terminal device. In a possible design, the paging group information of the terminal device or the paging identity of the terminal device is allocated only once in one TA area, and cannot be modified. It should be noted that the paging group information of the terminal device or the paging identity of the terminal device may be related to the quantity of POs of the terminal device, or may be related to the DRX cycle, or may be related to a quantity of synchronization signal (SS) blocks. In addition, terminal devices in different frequency bands may determine the paging group information based on different preamble sets or bandwidths. This is not limited in this application.

404. The terminal device determines, based on the paging indication information, whether to detect a PDSCH.

If the terminal device determines that the paging group to which the terminal device belongs is paged, the terminal device detects the PDSCH. That is, the terminal device decodes a message on the PDSCH. If the terminal device determines that the paging group to which the terminal device belongs is not paged, the terminal device does not detect the PDSCH (for example, the terminal device may directly sleep and skip receiving a corresponding PDSCH).

The terminal device may determine, based on the paging indication information and the paging group corresponding to the terminal device, whether to detect the PDSCH. For example, if bits of the paging indication information include 001001100100, and bits 2, 5, 6, and 9 are 1, it indicates that terminal devices in groups 2, 5, 6, and 9 are paged. In this case, the terminal devices in the groups 2, 5, 6, and 9 need to detect the PDSCH. To be specific, when determining that the paging group corresponding to the terminal device belongs to groups 2, 5, 6, and 9, the terminal device determines to detect the PDSCH.

It should be noted that there is no definite execution sequence between step 401 to step 404. An execution sequence among the steps is not specifically limited in this embodiment.

In this embodiment of this application, the terminal device may determine, based on the paging indication information, whether to detect the PDSCH, instead of being obliged to detect the PDSCH. This can reduce power consumption of detecting the PDSCH by the terminal device. The paging indication information includes or uses at least one of the following bits: all or some bits of the valid bits of the short message field in the DCI, all or some bits of the remaining bits of the short message field in the DCI, and all or some bits of the reserved field in the DCI. In this way, the length of the DCI is not increased, so that the power consumption of detecting a PDCCH by the terminal device is not increased.

In the foregoing embodiments provided in this application, the methods provided in the embodiments of this application are described from perspectives of the terminal device, the network device, and interaction between the network device and the terminal device. To implement functions in the methods provided in the foregoing embodiments of this application, the terminal device and the network device may include a hardware structure and/or a software module, and implement the foregoing functions in a form of the hardware structure, the software module, or a combination of the hardware structure and the software module. Whether a specific function in the foregoing functions is performed by the hardware structure, the software module, or the combination of the hardware structure and the software module depends on a specific application and a design constraint of the technical solutions.

Figure 7:
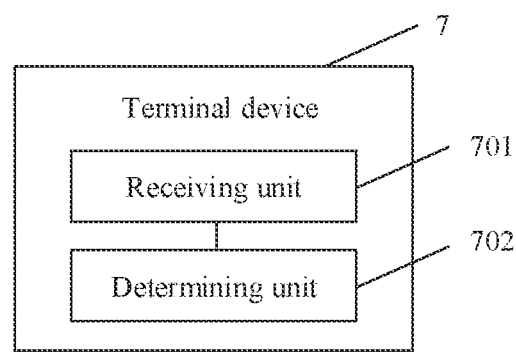
FIG. 7 is a schematic structural diagram of another terminal device according to an embodiment of this application.

When each functional module is obtained through division based on each corresponding function, FIG. 7 is a possible schematic structural diagram of a communications apparatus 7 in the foregoing embodiments. The communications apparatus may be a terminal device. The terminal device includes a receiving unit 701 and a determining unit 702. In this embodiment of this application, the receiving unit 701 may be configured to receive paging indication information, where the paging indication information includes at least one of the following bits: all or some bits of valid bits of a short message field in DCI, all or some bits of remaining bits of the short message field in the DCI, and all or some bits of a reserved field in the DCI. The determining unit 702 is configured to determine, based on the paging indication information, whether to detect a PDSCH. In the method embodiment shown in FIG. 4, the receiving unit 701 is configured to support the terminal device in performing the process 402 in FIG. 4. The determining unit 702 is configured to support the terminal device in performing the process 403 and the process 404 in FIG. 4. All related content of the steps in the foregoing method embodiments may be cited in function descriptions of a corresponding functional module. Details are not described herein again.

Optionally, the terminal device may further include a sending unit, configured to send paging group information of the terminal device or a paging identity of the terminal device to a network device. For details, refer to related steps in the embodiment shown in FIG. 4. Details are not described herein again.

Figure 8:
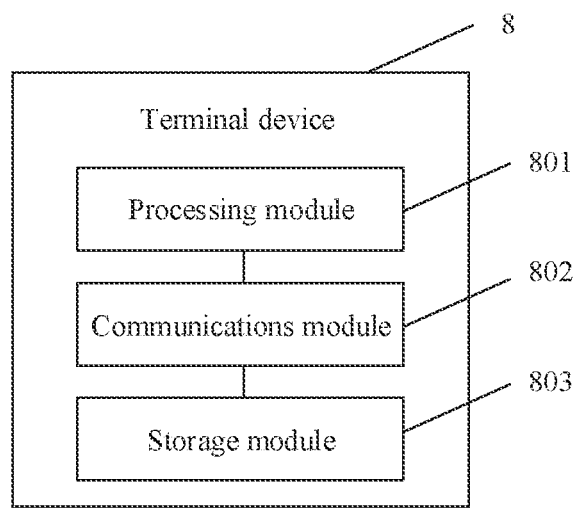
FIG. 8 is a schematic structural diagram of another terminal device according to an embodiment of this application.

When an integrated unit is used. FIG. 8 is a possible schematic structural diagram 2 of the terminal device in the foregoing embodiments. In this application, the terminal device may include a processing module 801, a communications module 802, and a storage module 803. The processing module 801 is configured to control hardware apparatuses, application software, and the like of each part of the terminal device. The communications module 802 is configured to receive an instruction and/or data sent by another device, and the communications module 802 may also send data of the terminal device to another device (for example, a network device). The storage module 803 is configured to: store a software program of the terminal device, store data, run software, and the like. The processing module 801 may be a processor or a controller, for example, may be a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The processing module may implement or execute various example logical blocks, modules, and circuits described with reference to content disclosed in this application. Alternatively, the processor may be a combination of processors implementing a computing function, for example, a combination including one or more micromonitoring units, or a combination of a DSP and a micromonitoring unit. The communications module 802 may be a transceiver, a transceiver circuit, a communications interface, or the like. The storage module 803 may be a memory.

It may be clearly understood by a person skilled in the art that, for steps performed by a terminal device 8 and corresponding beneficial effects, refer to related descriptions of the terminal device in the foregoing method embodiments. For brevity, details are not described herein again.

Figure 9:
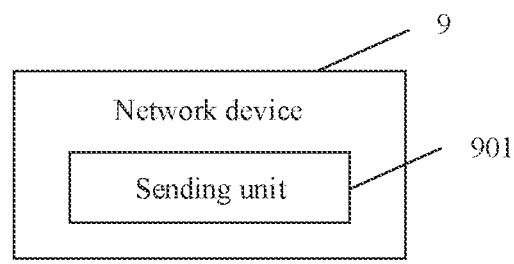
FIG. 9 is a schematic structural diagram of another network device according to an embodiment of this application.

When each functional module is obtained through division based on each corresponding function, FIG. 9 is a possible schematic structural diagram of a communications apparatus 9 in the foregoing embodiments. The communications apparatus may be a network device. The network device includes a sending unit 901. In this embodiment of this application, the sending unit 901 may be configured to send paging indication information, w % here the paging indication information includes at least one of the following bits: all or some bits of valid bits of a short message field in DCI, all or some bits of remaining bits of the short message field in the DCI, and all or some bits of a reserved field in the DCI; and the sending unit 901 may be configured to send a PDSCH. In the method embodiment shown in FIG. 4, the sending unit 901 is configured to support the network device in performing the process 401 in FIG. 4. All related content of the steps in the foregoing method embodiments may be cited in function descriptions of a corresponding functional module. Details are not described herein again.

Optionally, the network device may further include a receiving unit, configured to receive paging group information or a paging identity from the terminal device. For details, refer to related steps in the embodiment shown in FIG. 4. Details are not described herein again.

Figure 10:
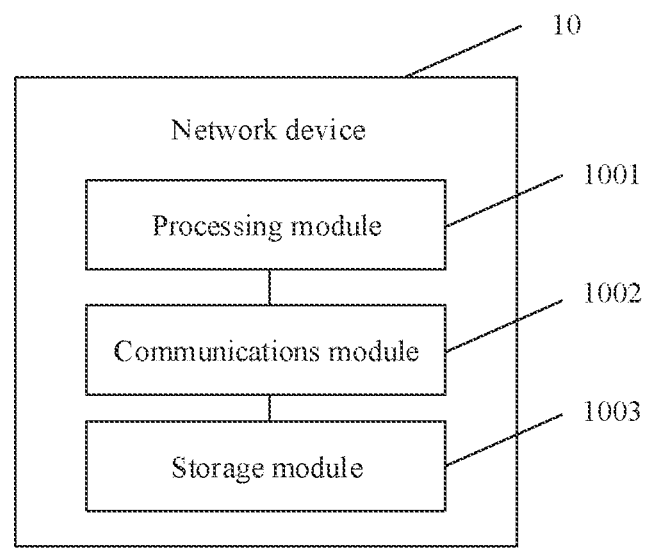
FIG. 10 is a schematic structural diagram of another network device according to an embodiment of this application.

When an integrated unit is used, FIG. 10 is a possible schematic structural diagram 2 of the terminal device in the foregoing embodiments. In this application, the terminal device may include a processing module 1001, a communications module 1002, and a storage module 1003. The processing module 1001 is configured to control hardware apparatuses, application software, and the like of each part of the terminal device. The communications module 1002 is configured to receive an instruction and/or data sent by another device, and the communications module 1002 may also send data of the terminal device to another device. The storage module 1003 is configured to; store a software program of the terminal device, store data, run software, and the like. The processing module 1001 may be a processor or a controller, for example, may be a CPU, a general-purpose processor, a DSP, an ASIC, an FPGA, or another programmable logic device, a transistor logic device, a hardware component, or any combination thereof. The processing module may implement or execute various example logical blocks, modules, and circuits described with reference to content disclosed in this application. Alternatively, the processor may be a combination of processors implementing a computing function, for example, a combination including one or more micromonitoring units, or a combination of a DSP and a micromonitoring unit. The communications module 1002 may be a transceiver, a transceiver circuit, a communications interface, or the like. The storage module 1003 may be a memory.

It may be clearly understood by a person skilled in the art that, for steps performed by a network device 10 and corresponding beneficial effects, refer to related descriptions of the network device in the foregoing method embodiments. For brevity, details are not described herein again.

The network device and the terminal device in the foregoing apparatus embodiments completely correspond to the network device and the terminal device in the method embodiments. A corresponding module or unit performs a corresponding step. For example, the communications module (transceiver) may perform a sending step and/or a receiving step in the method embodiments, and another step other than the sending step and the receiving step may be performed by the processing unit (processor). For a function of a specific unit, refer to the corresponding method embodiments. The sending unit and the receiving unit may form a transceiver unit, and a transmitter and a receiver may form a transceiver, to jointly implement a transceiver function. There may be one or more processors.

The terminal device or the network device may be a chip, and the processing unit may be implemented by hardware or software. When being implemented by the hardware, the processing unit may be a logic circuit, an integrated circuit, or the like; when being implemented by the software, the processing unit may be a general-purpose processor, and is implemented by reading software code stored in a storage unit. The storage unit may be integrated into the processor, or may be located outside the processor and exist independently.

The network device and the terminal device in the foregoing apparatus embodiments completely correspond to the network device and the terminal device in the method embodiments. A corresponding module or unit performs a corresponding step. For example, the sending module (transmitter) may perform a sending step in the method embodiments, the receiving module (receiver) performs a receiving step in the method embodiments, and another step other than the sending step and the receiving step may be performed by the processing module (processor). For a function of a specific module, refer to the corresponding method embodiments. The sending module and the receiving module may form a transceiver module, and the transmitter and the receiver may form a transceiver, to jointly implement a transceiver function. There may be one or more processors.

Division into modules or units in the embodiments of this application is an example, is merely logical function division, and there may be another division during actual implementation. In addition, functional modules in the embodiments of this application may be integrated into one processor, each of the modules may exist alone physically, or two or more modules may be integrated into one module. The integrated module may be implemented in a form of hardware, or may be implemented in a form of a software functional module. For example, in the embodiments of this application, the receiving unit and the sending unit may be integrated into the transceiver unit.

All or some of the methods provided in the embodiments of this application may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or the functions according to the embodiments of the present invention are generated. The computer may be a general-purpose computer, a dedicated computer, a computer network, a network device, user equipment, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, solid-state drive (SSD)), or the like.

It is clear that a person skilled in the art can make various modifications and variations to the embodiments of this application without departing from the spirit and scope of this application. In this way, this application is intended to cover these modifications and variations of the embodiments of this application provided that they fall within the scope of protection defined by the following claims and their equivalent technologies.

What is claimed is:

1. A paging method, comprising:
receiving a paging frame, wherein the paging frame comprises a paging occasion (PO) of a terminal device, wherein the PO is located in a first half of the paging frame and the PO comprises a paging message, wherein the paging message and a system message 1 have a common control resource set, and wherein a period of the system message 1 is 5 ms, wherein whether the PO is located in the first half of the paging frame or a second half of the paging frame is indicated by a bit in paging indication information; and
determining the paging message in the PO.

2. A paging method, comprising:
generating a paging frame, wherein the paging frame comprises a paging occasion (PO), wherein the PO is located in a first half of the paging frame and the PO comprises a paging message, wherein the paging message and a system message 1 have a common control resource set, and wherein a period of the system message 1 is 5 ms, wherein whether the PO is located in the first half of the paging frame or a second half of the paging frame is indicated by a bit in paging indication information; and
sending the paging frame.

3. A paging indication information transmission method, comprising:
receiving, by a terminal device, paging indication information, wherein the paging indication information comprises at least one of the following bits: at least one bit of valid bits of a short message field in downlink control information (DCI), at least one bit of remaining bits of the short message field in the DCI, or at least one bit of a reserved field in the DCI, wherein a quantity of bits of the paging indication information is related to at least one of the following: a quantity of paging occasions (POs) or a discontinuous reception (DRX) cycle; and
determining, by the terminal device based on the paging indication information, whether to detect a physical downlink shared channel (PDSCH).

4. The paging indication information transmission method according to claim 3, wherein before the determining, by the terminal device based on the paging indication information, whether to detect a PDSCH, the method further comprises:
determining, by the terminal device based on the paging indication information and an identity of the terminal device, whether a paging group to which the terminal device belongs is paged.

5. The paging indication information transmission method according to claim 3, wherein a length of the paging indication information is preset or configured by a network device.

6. The paging indication information transmission method according to claim 3, wherein
a length of the paging indication information is the same as a length of the valid bits of the short message field,
the length of the paging indication information is the same as a length of the remaining bits of the short message field,
the length of the paging indication information is the same as a length of the reserved field, the length of the paging indication information is the same as a sum of a length of the valid bits of the short message field and a length of the remaining bits of the short message field,
the length of the paging indication information is the same as a sum of a length of the valid bits of the short message field and a length of the reserved field,
the length of the paging indication information is the same as a sum of a length of the remaining bits of the short message field and a length of the reserved field, or
the length of the paging indication information is the same as a sum of a length of the valid bits of the short message field, a length of the remaining bits of the short message field, and a length of the reserved field.

7. The paging indication information transmission method according to claim 6, wherein
the valid bits of the short message field comprise the at least one bit of the valid bits of the short message field, wherein the remaining bits of the short message field comprise the at least one bit of the remaining bits of the short message field, and wherein the reserved field comprises the at least one bit of the reserved field.

8. The paging indication information transmission method according to claim 3, wherein the paging indication information indicates whether the terminal device is paged in a first discontinuous reception (DRX) cycle, or the paging indication information indicates whether the terminal device is paged in a first DRX cycle and n DRX cycles after the first DRX cycle, and wherein n is an integer greater than or equal to 1.

9. The paging indication information transmission method according to claim 3, wherein a length of the paging indication information is configured by a network device by using at least one of system information (SI), a master information block (MIB), remaining minimum system information (RMSI), a system information block 1, other system information (OSI), radio resource control (RRC) signaling, a media access control-control element (MAC CE), or DCI.

10. The paging method of claim 1, further comprising: receiving the paging indication information.

11. The paging method of claim 1, wherein the paging indication information comprises at least one of the following bits: at least one bit of valid bits of a short message field in downlink control information (DCI), at least one bit of remaining bits of the short message field in the DCI, or at least one bit of a reserved field in the DCI.

12. The paging method of claim 1, wherein a quantity of bits of the paging indication information is related to at least one of the following: a quantity of paging occasions (POs) or a discontinuous reception (DRX) cycle.

13. The paging method of claim 1, wherein a length of the paging indication information is preset or configured by a network device.

14. The paging method of claim 1, wherein a length of the paging indication information is configured by at least one of system information (SI), a master information block (MIB), remaining minimum system information (RMSI), a system information block 1, other system information (OSI), radio resource control (RRC) signaling, a media access control-control element (MAC CE), or DCI.

15. The paging method of claim 2, further comprising: sending the paging indication information.

16. The paging method of claim 2, wherein the paging indication information comprises at least one of the following bits: at least one bit of valid bits of a short message field in downlink control information (DCI), at least one bit of remaining bits of the short message field in the DCI, or at least one bit of a reserved field in the DCI.

17. The paging method of claim 2, wherein a quantity of bits of the paging indication information is related to at least one of the following: a quantity of paging occasions (POs) or a discontinuous reception (DRX) cycle.

18. The paging method of claim 2, wherein a length of the paging indication information is preset or configured by a network device.

19. The paging method of claim 2, wherein a length of the paging indication information is configured by at least one of system information (SI), a master information block (MIB), remaining minimum system information (RMSI), a system information block 1, other system information (OSI), radio resource control (RRC) signaling, a media access control-control element (MAC CE), or DCI.

* * * * *